Sept. 30, 1930.   A. J. TURNER   1,776,938
APPARATUS FOR LUBRICATING BEARINGS
Filed Feb. 15, 1928
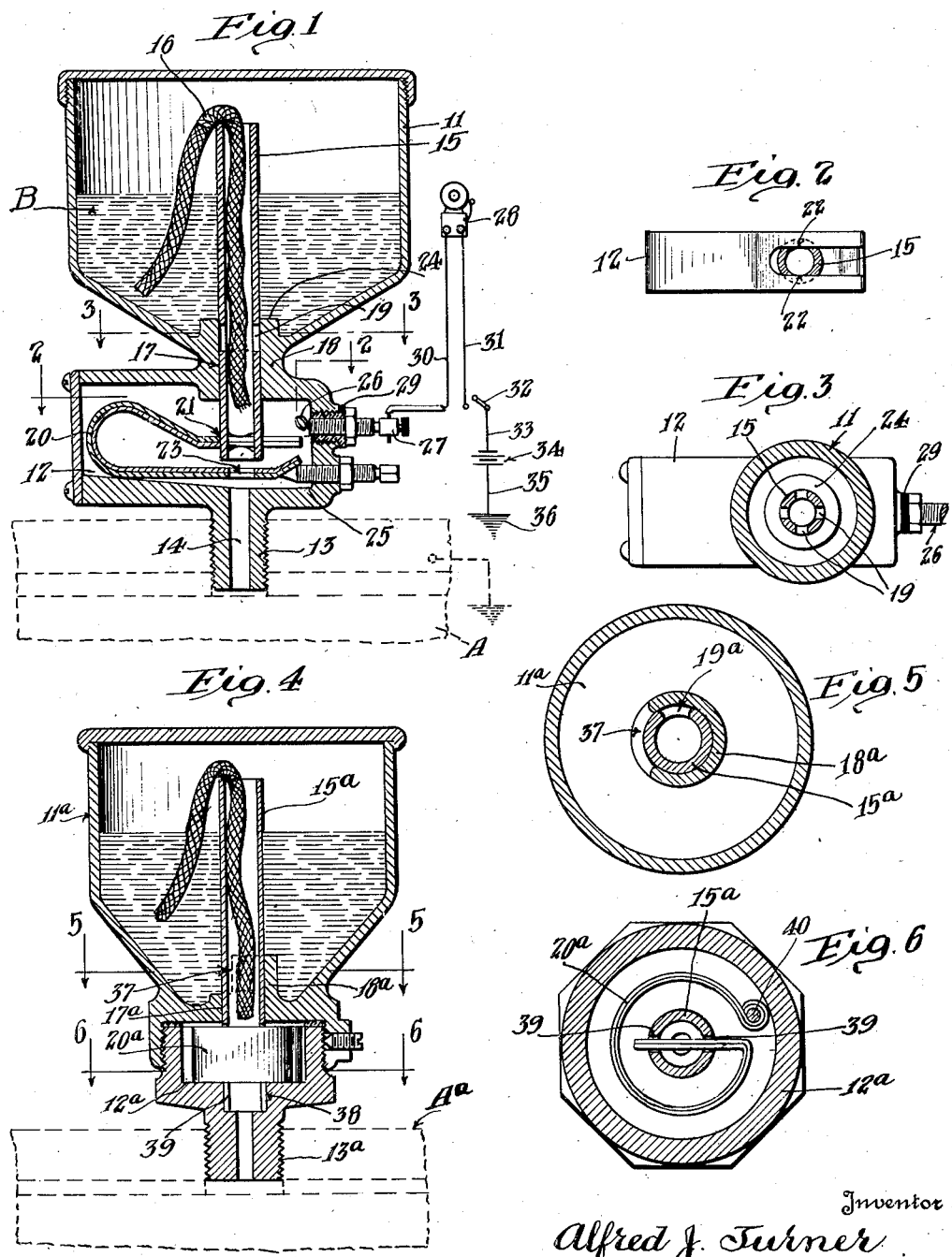

Patented Sept. 30, 1930

1,776,938

UNITED STATES PATENT OFFICE

ALFRED J. TURNER, OF SAN FRANCISCO, CALIFORNIA, ASSIGNOR TO STANDARD OIL COMPANY OF CALIFORNIA, OF SAN FRANCISCO, CALIFORNIA, A CORPORATION OF CALIFORNIA

APPARATUS FOR LUBRICATING BEARINGS

Application filed February 15, 1928. Serial No. 254,379.

This invention relates to apparatus for lubricating bearings and an object of the invention, in general, is to make provision for feeding lubricant to the bearing in accordance with the requirements thereof. More particularly the invention relates to the delivery of lubricant from a reservoir to the bearing in accordance with the temperature of the bearing.

An important object of the invention is to prevent overheating and burning out of bearings.

Another object is to afford maximum lubrication when the demand for lubrication is excessive.

It is the present practice to provide bearings with either drop feed or wick feed oilers, the former regulating the quantity of lubricant furnished to the bearing by different adjustments of a needle valve and the latter accomplishing the same end by a wick which by capillarity and siphonic action carries the oil from a reservoir to a conduit leading to the bearing.

The drop feed oiler is adjustable by hand to provide varying rates of flow of the lubricant and oilers of this type are usually made in part of glass so that the oil feed may be observed. The wick feed oiler is not readily adjustable within fine limits and, accordingly, it is the usual practice to provide a wick of a capacity that will furnish a surplus of oil to the bearing under normal operating conditions.

Because of varying conditions of load and temperature, for satisfactory lubrication thereof, the bearing should receive a volume of lubricant that varies with the conditions and it will be readily understood that the drop feed and wick feed oilers mentioned above do not provide the necessary degree of flexibility to accomplish the desired ends. By providing the lubricant in varying amounts, according to the demands, economy of consumption of the lubricant is also attained.

When there is a tendency to overheating of a bearing lubricated in the usual manner, owing to the lubricant feed being constant, the excess heat is not carried off and, accordingly, there is a loss of lubricating effect, deterioration of the lubricant and, when the temperature exceeds permissible limits, burning out of the bearing ensues and this results in shut-down of the machinery of which the bearing is a part.

The present invention conserves lubricating oil by supplying smaller quantities under low lubricating demands of the bearings and at the same time insures ample lubrication when the lubricating demand increases, thus preventing overheating of the bearings and costly shutdowns of the machinery.

The foregoing mentioned objects and advantages are accomplished by providing a mechanism that is responsive to changes in temperature so that the rate of oil delivery to the bearings increases when the temperature of the bearing approaches the danger point; that maintains the increased rate of flow of the lubricant so long as the condition of excess temperature persists; that further increases the rate of delivery of the lubricant with further increase of temperature; and that effects a reduction in the rate of delivery of the lubricant as the temperature again approaches normal.

More particularly, in the present instance, the apparatus includes a thermostatic element that is housed in a chamber that communicates with the interior of the bearing to which the lubricant is being fed.

The accompanying drawings illustrate several forms of the invention.

Fig. 1 is a sectional elevation of an apparatus constructed in accordance with the provisions of this invention for lubricating bearings, a bearing being fragmentarily indicated by broken lines.

Fig. 2 is a fragmental plan view, partly in section, from the line indicated by 2—2 Fig. 1.

Fig. 3 is a plan view, partly in section, from the line indicated by 3—3 Fig. 1.

Fig. 4 is a vertical section of a second form of apparatus embodying the invention, a bearing being fragmentarily indicated in broken lines.

Fig. 5 is a horizontal section on the line indicated by 5—5 Fig. 4.

Fig. 6 is a horizontal section on the line indicated by 6—6 Fig. 4.

First referring to Figs. 1-3 inclusive, illustrating a wick feed lubricating apparatus, a reservoir for the lubricant is indicated at 11 and is mounted on a chamber 12 which is provided with a screw threaded nipple 13 by which it is attached to a bearing, which is indicated at A in broken lines. The chamber 12 communicates with the interior of the bearing through a duct 14 and communicates with the reservoir through a conduit 15 which, in this instance, projects into the chamber 12. Preferably the conduit 15 and duct 14 are axially alined. The conduit 15 contains a wick 16 which hangs over the upper end of the conduit so that its outer end is submerged in the lubricant B in the reservoir 11.

The conduit 15 is movably mounted in a bore 17 of a neck 18 that connects the reservoir 11 and chamber 12; said bore 17 opening into the reservoir and chamber 12. The conduit 15 and neck 18 together constitute one form of valve means for controlling the flow of lubricant from the reservoir 11 into the duct 14 and the conduit 15 is provided with one or more ports 19 which, when the conduit 15 is moved sufficiently in one direction, may be caused to communicate with the reservoir 11 so that lubricant can flow through said ports into the conduit.

In this particular instance, the conduit 15 is slidably mounted so as to shift endwise and engaging the lower end of the conduit is a thermostatic element 20 for effecting movement of the conduit. In this particular instance the thermostatic element 20 form a loop and lies within the chamber 12 so that the extremities of the loop are positioned between the bore 17 and duct 14. The conduit 15 projects through an orifice 21 in the upper leg of the element 20 and said conduit is provided on opposite sides thereof with notches 22 in which the walls of the orifice 21 are engaged. The lower leg of the element 20 is provided with an orifice 23 which is axially alined with the conduit 15 and duct 14 so as to permit lubricant to pass from the conduit through the orifice 23 into the duct. In this particular instance the thermostatic element 20 rests upon the bottom of the chamber 12 and expansion of said element due to increase of temperature causes upward movement of the conduit. Thus, when the temperature becomes sufficiently great, the ports 19, which are shown in closed position in Fig. 1, will be moved to a position so that at least the upper ends of said ports are above the upper end 24 of the neck 18, thus communicating said ports with the reservoir. In this particular instance, the ports 19 are reduced in cross-sectional area upwardly so that the ratio between the extent of opening movement of the conduit 15 and the cross-sectional area of the uncovered portion of the ports increases.

A suitable means is provided for adjusting the thermostatic element 20 so as to be able to control the position of the ports 19 in relation to the reservoir 11 at any given temperature so that the ports may be caused to begin to open at any predetermined temperature desired. In this particular instance, the lower leg of the element 20 is adapted to be engaged by the inner end of an adjusting screw 25 which is screwed into one side of chamber 12 so as to project horizontally into said chamber. By screwing the screw 25 inwardly the element 20 will be raised so as to move the ports 19 nearer to the reservoir 11, thus causing opening of said ports to occur at a lower temperature. From this it will be readily seen that screwing of the screw 25 outwardly will insure that the ports 19 begin to open at a higher temperature.

The operation of that portion of the invention described above is as follows: assuming the working parts to be positioned as shown in Fig. 1 and that, owing to increase of load on the bearing A or of the speed of the rotating member, not shown, turning in said bearing, the temperature of the bearing increases, the increased heating will be transmitted to the chamber 12, causing expansion of the thermostatic element 20, thus elevating the ports 19 to a position where they communicate with the reservoir, thus permitting an additional supply of lubricant to flow into the conduit, thence through the chamber 12 to the duct 14 and thence to the bearing A, it being understood that the wick 16 will be made of sufficient capacity to carry a sufficient supply of lubricant to the bearing for proper lubrication of the bearing under lighter loads thereon and lower speeds of the member rotating in said bearing. The increased lubrication of the bearing, thus effected, will prevent burning out of the bearing as the increased flow of lubricant to the bearing will be maintained as long as the temperature is above the predetermined degree at which the thermostatic element 20 maintains the conduit 15 with its ports in closed position. When the conditions that gave rise to the increased temperature are removed and the temperature drops, the thermostatic element contracts, thus lowering the conduit and shutting the ports 19, whereupon the wick 16 alone supplies lubricant to the bearing.

In some instances it may be desirable to apprise an attendant of the rise in temperature of the bearing and accordingly I have provided an electrically operated alarm which is operated by movement of the thermostatic element into engagement with an electric contact 26. In this instance the contact 26 is on the inner end of a binding post 27 which is screwed horizontally into one side of the chamber 12 so as to position the contact 26 above the level of the adjacent end of element 20 when the ports 19 are closed. When the element 20 expands sufficiently to open the ports 19, the upper leg of said element engages the contact 26 so as to complete an electric circuit which passes through an alarm 28. The bearing A is grounded so that the electric current passes through the thermostatic element 20 and the binding post 27 is insulated at 29 from the chamber 12. A wire 30 connects the binding post to the signal 28 and a wire 31 connects the signal to one terminal of a switch 32 and the other terminal of said switch is connected by a wire 33 to a source 34 of electric current which is connected by a wire 35 to a ground 36. The ground 36 is on some part of the machinery provided with the bearing A. The signal 28 may be of any suitable description and, in the present instance, is of the audible type.

Now referring to Figs. 4–6, inclusive, the elements that correspond to those described above are indicated by the same reference characters with the addition of the letter *a*. In this form of the invention, which is also of the wick feed type, the conduit 15$^a$ is mounted to rotate in the neck 18$^a$. The neck 18$^a$ is provided at one side with an opening 37 so that when the conduit 15$^a$ is turned to a predetermined extent the port or ports 19$^a$ in the conduit 15$^a$ will register with the opening 37 and, consequently, communicate with the reservoir 11$^a$ so as to admit the lubricant from said reservoir into the conduit. In this instance the conduit 15$^a$ extends into a socket 38 in the bottom wall of the chamber 12$^a$ and the lower end of the conduit is provided with alined slots 39 which are engaged by the inner end of a circular thermostatic element 20$^a$, the outer end of said element being anchored by a stud 40 to the chamber 12$^a$. It will be readily seen that expansion of the thermostatic element 20$^a$ causes turning of the conduit 15$^a$ about its axis and, accordingly, when the temperature of the bearing A$^a$ rises sufficiently, the increased heat will cause the thermostatic element 20$^a$ to turn the conduit 15$^a$ to a position that will open the port 19$^a$.

From the foregoing it will be readily seen that I have provided a construction in which a thermostatically operated valve means controls the flow of lubricant to the bearing and that the thermostatic element is positioned in a chamber that lies between the lubricant reservoir or cup and the bearing. The construction disclosed provides for enclosure of all of the working parts and ample lubrication thereof so as to promote reliability of operation of the apparatus.

I claim:

1. An apparatus for lubricating bearings comprising a chamber provided with a duct, a reservoir mounted on the chamber, a movably mounted conduit extending from the reservoir into the chamber and provided with a port adapted to communicate with the reservoir when the conduit is moved in one direction and to be closed when said conduit is moved in the opposite direction, a means to feed a lubricant from the reservoir into said conduit at an approximately uniform rate irrespective of opening and closing of the port, and a thermostatic element in the chamber operably connected with the conduit.

2. An apparatus for lubricating bearings comprising a chamber provided with a duct, a reservoir, a neck connecting the reservoir and chamber and provided with a vertical bore, a conduit slidably mounted in said bore and provided with a port adapted to communicate with the reservoir when the conduit is moved endwise in one direction and to be closed by the neck when said conduit is moved endwise in the opposite direction, and a thermostatic element in the chamber operably connected with the conduit and positioned to expand and contract vertically.

3. An apparatus for lubricating bearings comprising a chamber provided with a duct, a thermostatic element in the chamber, a reservoir mounted on the chamber, a movably mounted conduit extending from the reservoir into the chamber and provided with a port adapted to communicate with the reservoir when the conduit is moved in one direction and to be closed when said conduit is moved in the opposite direction, a wick projecting from the conduit into the reservoir, and a thermostatic element in the chamber operably connected with the conduit.

4. An apparatus for lubricating bearings comprising a nipple provided with a duct, a reservoir connected with the nipple, a movably mounted conduit projecting into the reservoir and positioned to discharge lubricant into the duct and provided with a port that is opened and closed by movements of the conduit, a wick projecting from the conduit into the reservoir, and a thermostatic element operably connected with the conduit to move said conduit.

5. An apparatus for lubricating bearings comprising a reservoir, two relatively movable members, the one provided with a bore and the other in the form of a conduit extending from the reservoir into said bore, one of said members provided with a port adapted to communicate with the reservoir upon relative movement of the members in one direction and to be closed upon relative movement of said members in the opposite direction, a means to feed a lubricant from the reservoir into said conduit at an approximately uniform rate irrespective of opening and closing of the port, and a thermostatic element connected at its opposite ends with the respective members.

6. An apparatus for lubricating bearings comprising a reservoir, two relatively rotatable members, the one provided with a bore and the other in the form of a conduit extending from the reservoir into said bore, one of said members provided with a port adapted to communicate with the reservoir upon relative turning of the members in one direction and to be closed upon relative turning of said members in the opposite direction, a means to feed a lubricant from the reservoir into said conduit at an approximately uniform rate irrespective of opening and closing of the port, and a means including a thermostatic element operable by expansion and contraction of said element to rotate one of said members in opposite directions.

7. An apparatus for lubricating bearings comprising a reservoir, two relatively movable members, the one provided with a bore and the other in the form of a conduit extending from the reservoir into said bore, one of said members provided with a port adapted to communicate with the reservoir upon relative movement of the members in one direction and to be closed upon relative movement of said members in the opposite direction, a wick projecting from the conduit into the reservoir, and a thermostatic element connected at its opposite ends with the respective members.

8. An apparatus for lubricating bearings comprising a reservoir, two relatively rotatable members, the one provided with a bore and the other in the form of a conduit extending from the reservoir into said bore, one of said members provided with a port adapted to communicate with the reservoir upon relative turning of the members in one direction and to be closed upon relative turning of said members in the opposite direction, a wick projecting from the conduit into the reservoir, and means including a thermostatic element operable by expansion and contraction of said element to rotate one of said members in opposite directions.

9. An apparatus for lubricating bearings comprising a nipple provided with a duct, a reservoir connected with the nipple, a movably mounted conduit projecting into the reservoir and positioned to discharge lubricant into the duct and provided with a port that is opened and closed by movements of the conduit, a means to feed a lubricant from the reservoir into said conduit at an approximately uniform rate irrespective of opening and closing of the port, and a thermostatic element operably connected with the conduit to move said conduit.

Signed at San Francisco, California, this 7th day of February, 1928.

ALFRED J. TURNER.